(12) United States Patent
Salamon et al.

(10) Patent No.: US 11,728,998 B2
(45) Date of Patent: Aug. 15, 2023

(54) AUTHENTICATING COMMUNICATIONS BETWEEN PHYSICAL PORTS USING KNOWLEDGE OF SHARED SECRETS

(71) Applicant: EMC IP Holding Company LLC, Hopkinton, MA (US)

(72) Inventors: Victor Salamon, Edmonton (CA); John Mulvany-Robbins, Edmonton (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/077,293

(22) Filed: Oct. 22, 2020

(65) Prior Publication Data

US 2022/0131703 A1    Apr. 28, 2022

(51) Int. Cl.
*H04L 9/32* (2006.01)
*H04L 9/08* (2006.01)

(52) U.S. Cl.
CPC ............ *H04L 9/3242* (2013.01); *H04L 9/085* (2013.01); *H04L 9/0869* (2013.01)

(58) Field of Classification Search
None
See application file for complete search history.

(56) References Cited

U.S. PATENT DOCUMENTS

| | | | |
|---|---|---|---|
| 7,756,027 B1 * | 7/2010 | Reddy ................. | H04L 41/0806 370/230 |
| 8,984,635 B1 * | 3/2015 | Graham-Cumming | ...................... H04L 9/3239 726/23 |
| 9,954,859 B2 * | 4/2018 | Niset ...................... | H04L 9/3242 |
| 10,110,383 B1 * | 10/2018 | Tamilarasan .......... | H04L 9/3297 |
| 10,868,679 B1 * | 12/2020 | Van Antwerpen .... | H04L 9/0894 |
| 11,283,793 B2 * | 3/2022 | Khanna ................. | H04L 9/3228 |
| 2007/0046467 A1 * | 3/2007 | Chakraborty ............ | H04B 1/22 340/572.1 |
| 2008/0215883 A1 * | 9/2008 | Fok ...................... | H04L 63/0869 713/167 |
| 2009/0199002 A1 * | 8/2009 | Erickson ............... | H04L 9/3271 713/171 |
| 2010/0042839 A1 * | 2/2010 | Ho ........................ | H04L 9/0841 713/169 |

(Continued)

OTHER PUBLICATIONS https//:www.wifi-professionals.com/2019/01/4-way-handshake.

*Primary Examiner* — Bassam A Noaman
(74) *Attorney, Agent, or Firm* — Ryan, Mason & Lewis, LLP

(57) ABSTRACT

Techniques are provided for authenticating communications between physical ports using knowledge of shared secrets. One method comprises receiving, by a first entity, a connection request to establish a communication between physical ports of the first entity and a second entity; providing a first pseudo-random value to the second entity; obtaining a shared secret for communications with the second entity; generating a first hash value based on the shared secret and the first pseudo-random value; obtaining a second hash value from the second entity based on the shared secret and the first second pseudo-random value; and authenticating the communication in response to the first entity validating the first hash value using the second hash value. An encryption key based on the shared secret can protect communications between the physical ports of the first and second entities.

20 Claims, 7 Drawing Sheets

(56) References Cited

U.S. PATENT DOCUMENTS

| | | | | |
|---|---|---|---|---|
| 2014/0068274 A1* | 3/2014 | Kasatkin | ................. | G06F 21/64 |
| | | | | 713/189 |
| 2015/0007272 A1* | 1/2015 | Zou | ........................ | H04L 63/08 |
| | | | | 726/4 |
| 2017/0236343 A1* | 8/2017 | Leboeuf | ................ | H04L 9/0825 |
| | | | | 340/5.61 |
| 2018/0018229 A1* | 1/2018 | Bestler | .................... | G06F 3/064 |
| 2018/0123959 A1* | 5/2018 | Maslak | ................. | H04L 47/125 |
| 2018/0324152 A1* | 11/2018 | Jarchafjian | ............ | H04L 63/126 |
| 2020/0067708 A1* | 2/2020 | Subba | ................... | H04L 9/0841 |

\* cited by examiner

| OP CODE | COMMAND | RESPONSE | FUNCTION | DESCRIPTION |
|---|---|---|---|---|
| 0XC0 | OFFER | OFFER | SEND NONCE | TARGET/INITIATOR USES THIS TO SEND THEIR GENERATED NONCE |
| 0XC1 | | KEY_OK | OK TO INSTALL KEY | USED FOR THE TARGET TO INFORM THE INITIATOR THAT THE HANDSHAKE WAS SUCCESSFUL AND THAT THEY CAN INSTALL THE KEY FOR TRANSMISSION |
| 0XC2 | | KEY_ERR | INCORRECT PASSWORD | USED TO INFORM THE INITIATOR THAT THE PASSWORD WAS INCORRECT AND PREVENTS THE TARGET FROM SENDING ENCRYPTED DATA THAT COULD BE SUSCEPTIBLE TO A SIDE CHANNEL ATTACK |
| 0XC3 | SEC_ENA | | ENABLE PORT SECURITY | IF SECURITY IS ALREADY ENABLED, THIS IS IGNORED |
| 0XC4 | SEC_DIS | | DISABLE PORT SECURITY | INITIATOR WILL HAVE TO BE AUTHENTICATED BEFORE THIS COMMAND CAN BE ACKNOWLEDGED BY THE TARGET |
| 0XC5 | SEC_PASS | | SET PASSWORD | INITIATOR WILL HAVE TO BE AUTHENTICATED TO RUN THIS COMMAND |
| 0XC6 | SEC_CON | | CONNECT SECURELY | INITIATOR USES THIS TO INITIATE THE KEY DERIVATION HANDSHAKE WITH THE TARGET |

1. INITIATOR INITIATES CONNECTION BY TRANSMITTING A CONNECTION REQUEST (SEC_CON) TO TARGET;

2. TARGET GENERATES A NONCE AND RESPONDS TO INITIATOR REQUEST WITH GENERATED NONCE AND IDENTIFIER OF TARGET USING AN OFFER RESPONSE;

3. INITIATOR GENERATES ANOTHER NONCE;

4. INITIATOR HASHES SHARED SECRET, IDENTIFIER OF TARGET, NONCE GENERATED BY TARGET AND NONCE GENERATED BY INITIATOR USING SECURE HASHING ALGORITHM;

5. INITIATOR SENDS NONCE FROM STEP 3 AND HASH VALUE FROM STEP 4 TO TARGET (OFFER COMMAND)

6. TARGET PERFORMS SAME HASH OPERATION AS INITIATOR AND RESPONDS WITH AN ACKNOWLEDGEMENT WHEN HASH VALUES GENERATED BY BOTH PARTIES ARE EQUAL

7. TARGET HASHES HASH VALUE FROM STEP 6 AND SHARED SECRET N TIMES (WHERE N SHOULD BE GREATER THAN 1) USING A SECURE HASHING ALGORITHM SUCH AS SHA1 AND SENDS RESULT TO INITIATOR FOR VERIFICATION a. INITIATOR PERFORMS SAME OPERATION AND IF THE SAME HASH VALUE IS DERIVED, INITIATOR RESPONDS WITH KEY_OK, OTHERWISE, KEY_ERROR.

FIG. 4

ENABLE PORT SECURITY ON TARGET:

1. THROUGH TERMINAL SESSION;
2. MANUFACTURER SETS UP PORT SECURITY SUCH THAT ONLY SECURE MODE CAN BE USED; OR
3. USING PROTOCOL AS FOLLOWS:
   - INITIATOR CONNECTS TO TARGET AND ISSUES A SEC_ENA REQUEST (FIG. 3);
   - IF DEFAULT PASSWORD IS SET, A SECURE HANDSHAKE IS PERFORMED (FIGS. 4 and 5);
   - AFTER HANDSHAKE IS COMPLETE, INITIATOR ISSUES A SEC_PASS COMMAND THAT SENDS PASSWORD TO TARGET; AND
   - BOTH TARGET AND INITIATOR SAVE PASSWORD AND ANY INITIATOR DEVICE HAVING PASSWORD CAN AUTO-CONNECT TO TARGET AS A TRUSTED DEVICE.

AUTHENTICATING COMMUNICATIONS BETWEEN PHYSICAL PORTS USING KNOWLEDGE OF SHARED SECRETS

FIELD

The field relates generally to information processing systems, and more particularly to communication techniques for such information processing systems.

BACKGROUND

There are a number of existing protection techniques to encrypt data and/or to maintain the privacy of the data when the data is transmitted over a network. Such existing protection techniques, however, do not protect from direct access to the data. Thus, an intruder with physical access to a storage array, for example, or to a data connection between a host and the storage array, can read and/or alter the transmitted data.

Consider a data center that has implemented a number of data protection techniques at a software level. The data may be secure from software attacks, but the data is not secure from attacks based on physical access. Thus, if an attacker has physical access to a device, network or building circuitry, the attacker can, for example, (i) physically connect to a port and read, write or transform data, and/or (ii) perform a variation of a man-in-the-middle attack, whereby the attacker secretly relays and possibly alters communications between two parties who believe that they are communicating directly with each other. Such an attacker can use a wiretap (e.g., by inserting an electrical circuit that can read data being electrically transmitted) to read and/or alter the transmitted data.

A need exists for improved techniques for protecting data from such attacks.

SUMMARY

In one embodiment, a method comprises receiving, by a first entity associated with a communication between a first physical port of the first entity and a second physical port of a second entity, a connection request to establish a communication with the second entity; generating a first pseudo-random value; providing the first pseudo-random value to the second entity; obtaining a shared secret established for communications with the second entity; generating a first hash value based at least in part on the shared secret and the first pseudo-random value; obtaining a second hash value from the second entity based at least in part on the shared secret and the first pseudo-random value; and authenticating the communication in response to the first entity validating the first hash value using the second hash value.

In at least some embodiments, a third hash value is generated based at least in part on the shared secret and providing the third hash value to the second entity, wherein the second entity generates a fourth hash value based at least in part on the shared secret and provides an acknowledgement to the first entity in response to the fourth hash value matching the third hash value. An encryption key can be generated for the communication between the first physical port of the first entity and the second physical port of the second entity based at least in part on the shared secret.

Other illustrative embodiments include, without limitation, apparatus, systems, methods and computer program products comprising processor-readable storage media.

BRIEF DESCRIPTION OF THE DRAWINGS

FIG. 3 is a sample table illustrating a number of characteristics for exemplary commands for a data access protocol, according to at least some embodiments;

FIG. 4 illustrates exemplary pseudo code for authenticating communications between physical ports using knowledge of shared secrets, according to one embodiment of the disclosure;

FIG. 6 illustrates exemplary pseudo code for enabling port security on an exemplary target device, according to one embodiment of the disclosure.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
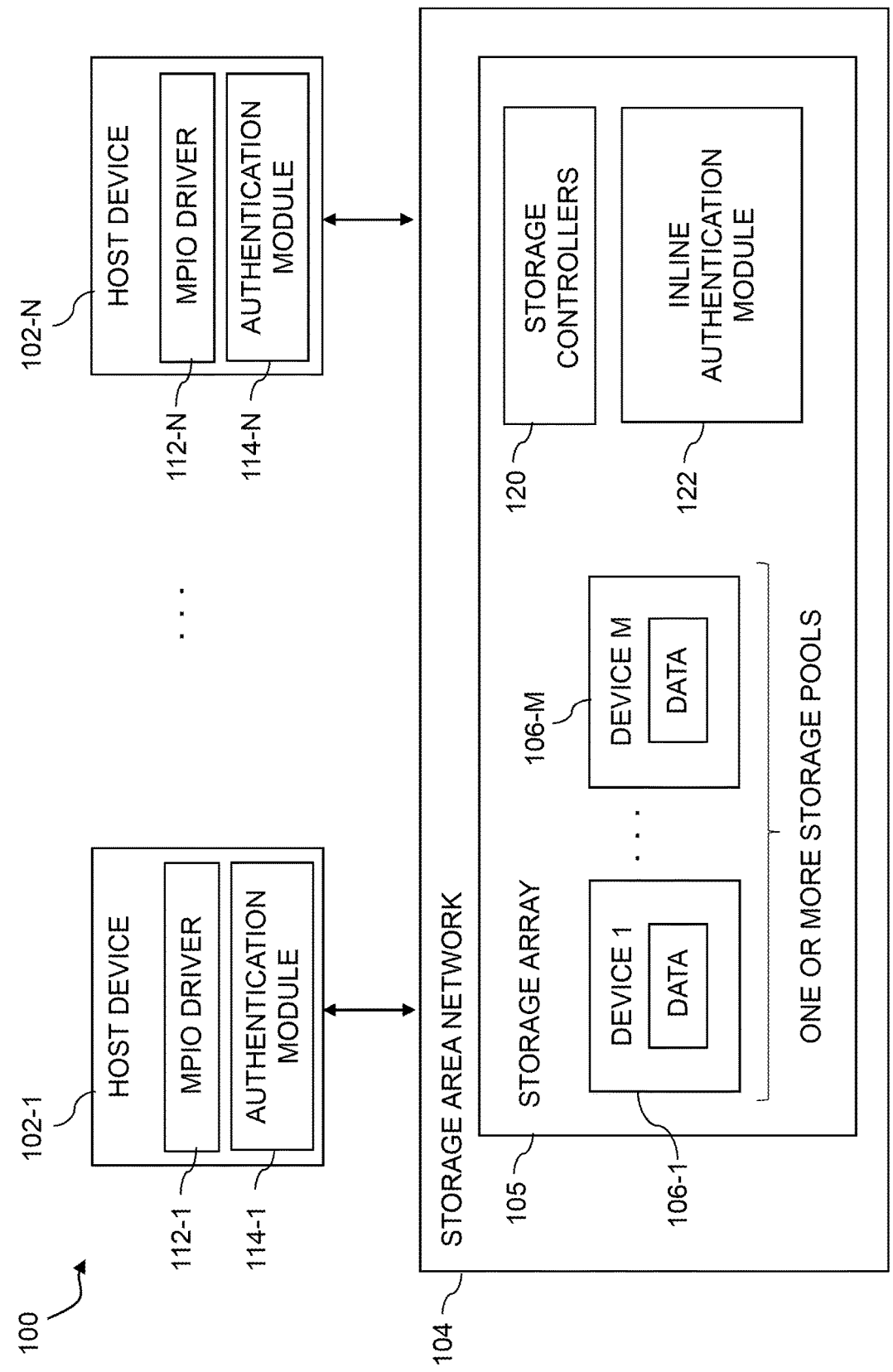
FIG. 1 is a block diagram of an information processing system configured with functionality for authenticating communications between physical ports using knowledge of shared secrets in an illustrative embodiment.

FIG. 1 shows an information processing system 100 configured for authenticating communications between physical ports using knowledge of shared secrets in accordance with an illustrative embodiment. The information processing system 100 comprises a plurality of host devices 102-1 through 102-N. The host devices 102 communicate over a storage area network (SAN) 104 with at least one storage array 105. The storage array 105 comprises a plurality of storage devices 106-1 through 106-M each storing data utilized by one or more applications running on one or more of the host devices 102. The storage devices 106 are illustratively arranged in one or more storage pools. The storage array 105 and its associated storage devices 106 are an example of what is more generally referred to herein as a "storage system." This storage system in the present embodiment is shared by the host devices 102 and is therefore also referred to herein as a "shared storage system."

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities. Compute services may be provided for users under a Platform-as-a-Service (PaaS) model, although it is to be appreciated that numerous other cloud infrastructure arrangements could be used.

The storage devices 106 of the storage array 105 of SAN 104 implement logical volumes such as, e.g., logical units (LUNs), that are configured to store objects for users associated with the host devices 102. These objects can comprise files, blocks or other types of objects. In illustrative embodiments, the storage devices 106 may comprise one or more clusters of storage devices 106. The host devices 102 interact with the storage array 105 utilizing read and write commands as well as other types of commands and/or communications that are transmitted over the SAN 104. Such commands and/or communications in some embodiments more particularly comprise, for example, Small Computer System Interface (SCSI) communications, Internet SCSI (iSCSI) communications, Fibre Channel Protocol (FCP) communications, Universal Serial Bus (USB) communications, or non-volatile memory express (NVMe) communications, although other types of commands and/or communications can be used in other embodiments. A given IO operation, as that term is broadly used herein, illustratively comprises one or more such commands. References herein to terms such as "input-output" and "10" should be understood to refer to input and/or output. Thus, an IO operation relates to at least one of input and output.

Also, the term "storage device" as used herein is intended to be broadly construed, so as to encompass, for example, a logical storage device such as a LUN or other logical volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple IO paths to the storage array 105, with at least one of the storage devices 106 of the storage array 105 being visible to that host device on a given one of the paths. A given one of the storage devices 106 may be accessible to the given host device over multiple IO paths. In illustrative embodiments, with reference also to the example of FIG. 2, each of the host devices 102 comprises one or more hardware bus adapter (HBA) ports 200, e.g., HBA ports 200-1 and 200-2 in the example of FIG. 2, which are utilized to communicate with the storage array 105 via the SAN 104. In some embodiments, the HBA ports 200 are referred to as initiators for the IO paths. For example, the HBA port 200-1 of host device 102-1 may be referred to as initiator 1 (I1) and the HBA port 200-2 of host device 102-1 may be referred to as initiator 2 (I2). HBA ports 200 may comprise any circuitry that is configured to enable communication between the host devices 102 and the storage array 105 or any other devices.

In some embodiments of a SAN 104, each host device 102 is made visible to LUNs via multiple array target ports, and hence LUNs can be accessed via multiple paths. During a failure in a target port, multipathing software retires the failed IO via alternate paths and ensures that the IO succeeds. Whenever a path failure happens, however, the IO retry on other active paths incur a penalty.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols. In some embodiments, the disclosed techniques for authenticating communications between physical ports can protect one or more wired components of such wireless communications.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays.

Storage array 105 also comprises one or more storage controllers 120. In illustrative embodiments, controllers 120 comprise processing devices, memory, or other circuitry that may be used to service input-output operations that are received from the host devices 102. While controllers 120 may be described as comprising particular configurations herein, controllers 120 are not limited to the disclosed embodiments and may comprise any other configuration of electrical and software components that may be utilized to service input-output operations that are received from host devices 102 by storage array 105. With reference also to the example of FIG. 2, in some embodiments, each of the controllers 120 comprises one or more ports 202, which are utilized to communicate with the host devices 102 via the SAN 104.

Storage array 105 further comprises one or more inline authentication modules 122 that implement the storage-side functionality of the disclosed techniques for authenticating communications between physical ports using knowledge of shared secrets, as discussed hereinafter.

Figure 2:
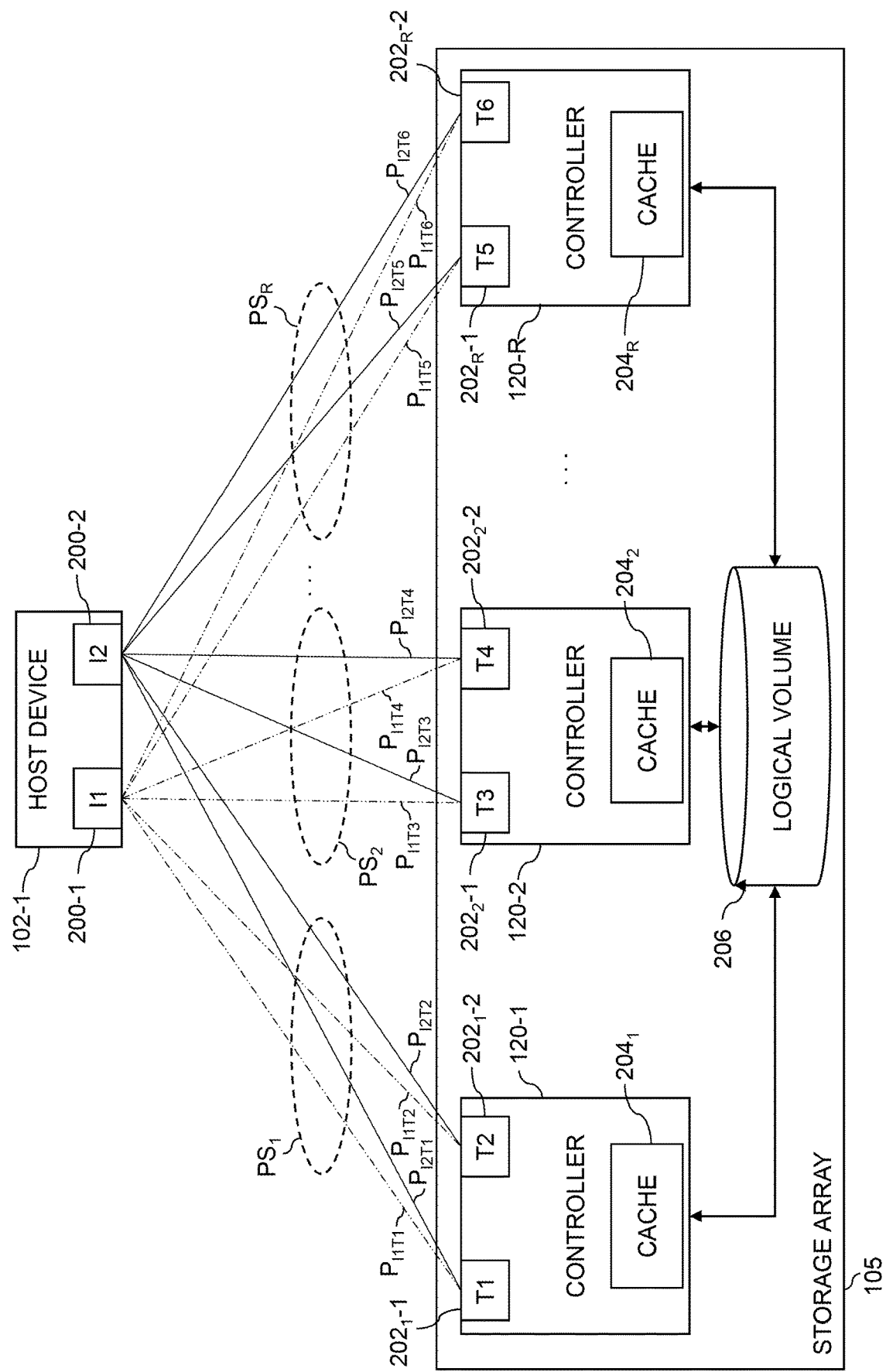
FIG. 2 is a block diagram illustrating paths between a host device and controllers of the information processing system of FIG. 1 in one or more illustrative embodiments.

In the example shown in FIG. 2, controller 120-1 comprises ports $202_1$-1 and $202_1$-2, controller 120-2 comprises ports $202_2$-1 and $202_2$-2, . . . and controller 120-R comprises ports $202_R$-1 and $202_R$-2. In some embodiments, the ports 202 are referred to as targets for the IO paths. For example, in the illustrated example, the ports $202_1$-1 and $202_1$-2 of controller 120-1 may be referred to as targets 1 (T1) and 2 (T2) respectively, the ports $202_2$-1 and $202_2$-2 of controller 120-2 may be referred to as targets 3 (T3) and 4 (T4) respectively, and the ports $202_R$-1 and $202_R$-2 of controller 120-R may be referred to as targets 5 (T5) and 6 (T6) respectively.

The cache $204_1$, $204_2$, $204_R$ of each of the controllers 120 comprises one or more memory devices such as, e.g., random access memory (RAM), read-only memory (ROM), flash memory or other types of memory, in any combination.

In some embodiments, a global cache is employed that is separate from and accessible by all of the controllers 120. The global cache may comprise one or more memory devices such as, e.g., RAM, ROM, flash memory or other types of memory, in any combination. In some embodiments, the caches 204 of one or more of the controllers 120 may together comprise some or all of the global cache.

As mentioned above, communications between the host devices 102 and the storage array 105 may utilize PCIe connections or other types of connections implemented over one or more networks. For example, illustrative embodiments can use interfaces such as Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage array 105 may additionally or alternatively be configured to implement multiple distinct storage tiers of a multi-tier storage system. By way of example, a given multi-tier storage system may comprise a fast tier or performance tier implemented using flash storage devices, and a capacity tier implemented using hard disk drive devices. A wide variety of other types of server-based flash storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, disk drives, flash drives, solid-state drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage array 105 may comprise one or more storage arrays such as VNX®, VMAX®, Unity™ or PowerMax™ storage arrays, commercially available from Dell EMC.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

The host devices 102 comprise respective sets of MPIO drivers 112-1 through 112-N and respective authentication modules 114-1 through 114-N. The MPIO drivers 112 collectively comprise a multipath layer of the host devices 102. The authentication modules 114 may be implemented as part of the MPIO drivers 112 of the respective host devices 102 or separate from the MPIO drivers 112, as shown in the example of FIG. 1.

MPIO drivers 112 typically group all paths from a host device to a logical volume, such as a LUN, into a single logical device known as a multipath device. The individual block devices representing each path are known as native devices. Applications use a multipath device for IO operations so that the IO operations may be distributed across all available paths. When paths fail or timeout, the MPIO driver will typically redirect the IO operations to other alive paths in the multipath device.

The MPIO drivers 112 described herein may comprise, for example, otherwise conventional MPIO drivers, such as PowerPath® drivers from Dell EMC, suitably modified in the manner disclosed herein to provide functionality for authenticating communications between physical ports using knowledge of shared secrets. Other types of MPIO drivers from other driver vendors may be suitably modified to incorporate functionality for the configuration of block devices as disclosed herein.

While one or more embodiments of the disclosed techniques for authenticating communications between physical ports using knowledge of shared secrets are illustrated in the context of an exemplary MPIO environment, the disclosed techniques may be used in any communication environment where two entities communicate using respective physical ports, as would be apparent to a person of ordinary skill in the art.

In illustrative embodiments to be described below, it is assumed without limitation that the initiators of a plurality of initiator-target pairs comprise respective HBAs of the host device 102-1 and that the targets of the plurality of initiator-target pairs comprise respective ports of the storage array 105. Examples of such HBAs and storage array ports are illustrated in conjunction with the embodiment of FIG. 2.

Selecting a particular one of multiple available paths for delivery of a selected one of the IO operations of the IO queues is more generally referred to herein as "path selection." Path selection as that term is broadly used herein can in some cases involve both selection of a particular IO operation and selection of one of multiple possible paths for accessing a corresponding logical device of the storage array 105. The corresponding logical device illustratively comprises a LUN or other logical storage volume to which the particular IO operation is directed.

Paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from the respective addition or deletion of at least a portion of the storage devices 106 of the storage array 105.

Addition or deletion of paths can also occur as a result of zoning and masking changes or other types of storage system reconfigurations performed by a storage administrator or other user.

In some embodiments, paths are added or deleted in conjunction with the addition of a new storage array or the deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be performed by the MPIO drivers of the multipath layer as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

For each of one or more new paths identified in a path discovery scan of the type described above, the corresponding one of the host devices 102 is configured to execute a host registration operation for that path. The host registration operation for a given new path illustratively provides notification to the storage array 105 that the corresponding one of the host devices 102 has discovered the new path.

With reference again to the example of FIG. 2, host device 102-1 comprises a multipath device that includes a plurality of paths P between the host device 102-1 and a logical volume 206 of the storage array 105. Each path P comprises an initiator and a target. For example, a path $P_{I1T1}$ from host device 102-1 to the logical volume 206 comprises initiator I1 (i.e., HBA port 200-1 of host device 102-1) and target T1 (i.e., port $202_1$-1 of controller 120-1). Paths $P_{I2T1}$, $P_{I1T2}$, $P_{I2T2}$, $P_{I1T3}$, $P_{I2T3}$, $P_{I1T4}$, $P_{I2T4}$, $P_{I1T5}$, $P_{I2T5}$, $P_{I1T6}$ and $P_{I2T6}$ similarly comprise respective initiators and targets as illustrated. The paths P of the multipath device that utilize the same controller 120-1 may also be grouped together as path sets PS. As illustrated in FIG. 2, for example, paths $P_{I1T1}$, $P_{I2T1}$, $P_{I1T2}$ and $P_{I2T2}$ utilize controller 120-1 and are grouped together into a path set $PS_1$; paths $P_{I1T3}$, $P_{I2T3}$, $P_{I1T4}$ and $P_{I2T4}$ utilize controller 120-2 and are grouped together into a path set $PS_2$; and paths $P_{I1T5}$, $P_{I2T5}$, $P_{I1T6}$ and $P_{I2T6}$ utilize controller 120-R and are grouped together into a path set $PS_R$.

The MPIO drivers utilize the multiple paths described above to send IO operations from the host devices 102 to the storage array 105.

For example, an MPIO driver 112-1 is configured to select IO operations from its corresponding IO queues for delivery to the storage array 105 over the SAN 104. The sources of the IO operations stored in the IO queues illustratively include respective processes of one or more applications executing on the host device 102-1. Other types of sources of IO operations may be present in a given implementation of system 100.

While one or more embodiments are illustrated herein using an exemplary SCSI protocol, the disclosed techniques for authenticating communications between physical ports using knowledge of shared secrets may be applied to any data storage access protocol, as would be apparent to a person of ordinary skill in the art.

In one or more embodiments, integrity and authenticity are provided to an exemplary SCSI network/circuit using secure encryption and a zero-knowledge protocol handshake to exchange symmetric encryption keys, whereby one party (e.g., the prover) can prove to another party (e.g., the verifier) that they know a value x, without conveying any information apart from the fact that they know the value x.

In some embodiments, an encrypted tunnel is provided between two trusted devices, such as an initiator device and a target device that communicate over the SCSI protocol. Generally, an initiator device is an endpoint that initiates a session and sends commands, such as a host adaptor port. Likewise, a target device is an endpoint that the initiator connects to, and sends commands to, and reads responses from, such as a storage array port.

FIG. 3 is a sample table 300 illustrating a number of characteristics for exemplary commands for a data access protocol, according to at least some embodiments. The example of FIG. 3 provides a number of extensions or amendments for the exemplary SCSI protocol. As part of the SCSI protocol, there are 196 available command slots, with opcodes between 0xC0 and 0xFF, reserved as vendor specific codes. FIG. 3 provides seven additional opcodes, and indicates the command, response, function and description for each new opcode.

FIG. 4 illustrates exemplary pseudo code 400 for authenticating communications between physical ports using knowledge of shared secrets, according to one embodiment of the disclosure.

As shown in the FIG. 4 example, the following functions are performed:
1. Initiator device initiates connection by transmitting a connection request (e.g., using sec_con command of FIG. 3) to Target device;
2. Target device generates a nonce and responds to initiator device request with generated nonce and identifier of target device, e.g., using an offer response of FIG. 3;
3. Initiator device generates another nonce;
4. Initiator device hashes shared secret, identifier of target device, nonce generated by target device and nonce generated by initiator device using secure hashing algorithm;
5. Initiator device sends nonce from step 3 and hash value from step 4 to target device (e.g., using offer command of FIG. 3)
6. Target device performs same hash operation as initiator device and responds with an acknowledgement when hash values generated by both parties are equal; and
7. Target device optionally hashes hash value from step 6 and shared secret N times (where N should be greater than 1) using a secure hashing algorithm such as sha1 and sends result to initiator device for verification
    a. Initiator device performs same operation and if the same hash value is derived, initiator device responds with key_ok, otherwise, responds with key_error.

Such references herein to optional steps or elements should not be construed to suggest that other steps or elements are required in other embodiments.

Figure 5:
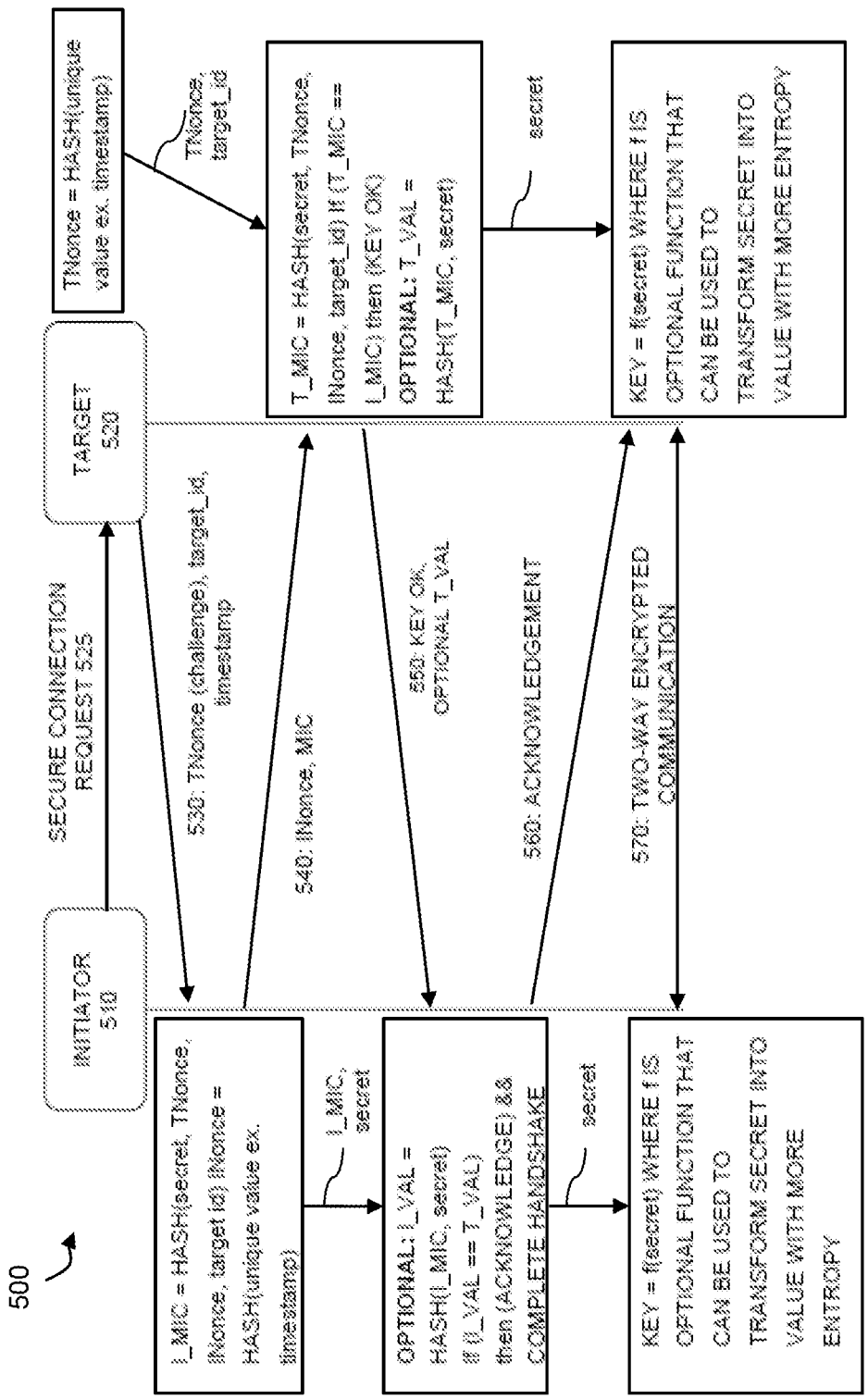
FIG. 5 is a communication diagram illustrating a number of exemplary interactions between an initiator and a target, according to an embodiment.

FIG. 5 is a communication diagram 500 illustrating a number of exemplary interactions between an initiator device 510 and a target device 520, according to an embodiment. As shown in FIG. 5, the initiator device 510 sends a secure connection request to the target device 520 during step 525. The target device 520 then generates a TNonce value by hashing a unique value, such as a timestamp, and sends the TNonce value to the initiator device 510 during step 530 as a challenge, with an identifier of the target device and a timestamp. In at least some embodiments, a nonce is a single use, randomly generated string of bytes.

The initiator device 510 then determines an I_MIC value by hashing a shared secret, the received TNonce value, an INonce value (optionally generated by the initiator device 510 in a similar manner as the TNonce value), and the identifier of the target device, and sends the computed MIC value and the INonce value to the target device 520 during step 540. It is noted that in some embodiments, the INonce value is not generated by the initiator device 510.

In some embodiments, the initiator device 510 and the target device 520 may obtain the shared secret, for example, during a configuration of the respective device 510, 520 (e.g., by an administrator secret using their respective user interfaces, at a time of deployment, and typically not at a time of manufacturing). In another variation, the initiator device 510 and the target device 520 may share the shared secret, for example, when they are physically connected and they verify that their shared secret matches.

The target device 520 determines a T_MIC value by hashing the shared secret, the generated TNonce value, the received INonce value and the identifier of the target device. If the determined T_MIC value matches the receives I_MIC value, the target device 520 determines that the key is validated. The target device 520 also optionally calculates a T_VAL value by hashing the T_MIC value and the shared secret.

The target device 520 then sends a key_ok indication and, optionally, the calculated T_VAL value to the initiator device 510 during step 550. In some embodiments, the initiator device 510 also optionally calculates an I_VAL value by hashing the I_MIC value and the shared secret.

The initiator device 510 determines if the calculated I_VAL value matches the received T_VAL value. If the values match, the initiator device 510 sends an acknowledgement to the target device 520 during step 560 and the handshake is completed.

Thereafter, the initiator device 510 and the target device 520 calculate an encryption key as a function of the shared secret, where the optional function transforms the shared secret into a value having additional entropy. The encryption key is used for two-way encryption during step 570, for example, to encrypt each message between the initiator device 510 and target device 520.

When data is encrypted, each packet will be sent with a Message Authentication Code (MAC) to detect corruption of the data. Furthermore, to prevent replay attacks, a sequence number can be added to the packet and is used to derive the MAC so that it can be verified by the receiver.

FIG. 6 illustrates exemplary pseudo code 600 for enabling port security on an exemplary target device, according to one embodiment of the disclosure. A target device can have secure mode enabled or disabled by default. When enabled, the target will only respond to SEC_CON requests (FIG. 3) sent from an initiator until a secure handshake of FIG. 5 is performed.

As shown in the example of FIG. 6, the following functions are performed in some embodiments to enable port security on the target:
1. Through a terminal session;
2. Manufacturer can set up port security such that only the secure mode can be used; and/or
3. Using the disclosed protocol, as follows:
Initiator connects to target and issues a SEC_ENA request (FIG. 3);
During manufacturing, a default password can be set. If there is a default password, a secure handshake will be performed as described in FIG. 5;

After the handshake is complete, the initiator will issue a SEC_PASS command (FIG. 3) that will send the password to the target; and Both the target and initiator will save the password and any initiator device that has the password installed in its SCSI driver will be able to auto-connect to the target in the future as a trusted device.

In some embodiments, a number of ports can have their passwords set in bulk with a batch request. This batch processing typically requires the use of username and password pairs, and a super user that can create/delete these pairs. This can be useful for the case of storage applications, in which there may be a need for virtual mapping of ITLs (Initiator Target LUNs) to different partitions on an array. In this case, an ITL would represent a single user that has access to a partition on an array, but not the entire array itself.

Figure 7:
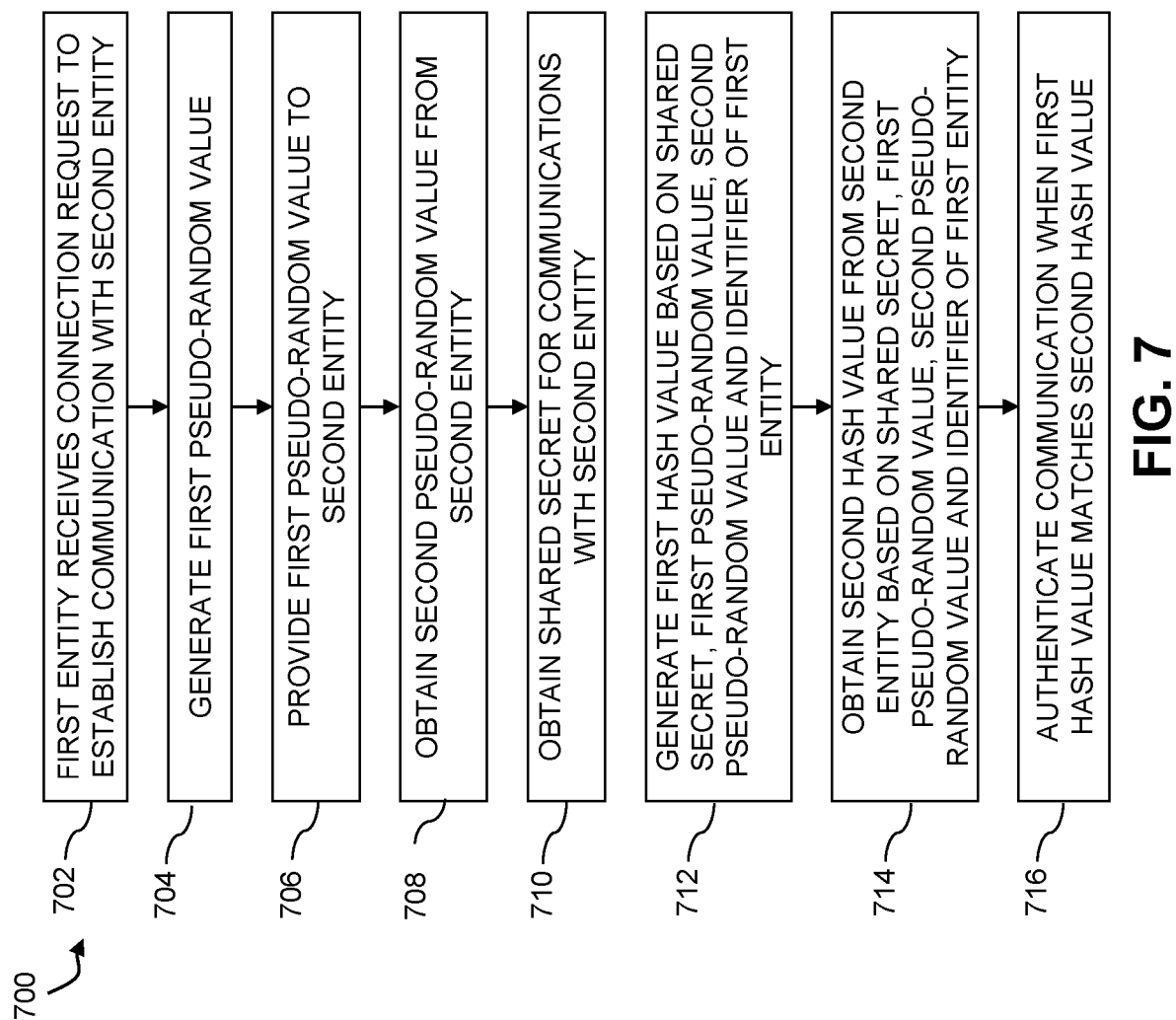
FIG. 7 is a flow diagram of an example process for authenticating communications between physical ports using knowledge of shared secrets in some embodiments.

FIG. 7 is a flow diagram of an example process 700 for authenticating communications between physical ports using knowledge of shared secrets in some embodiments. As shown in FIG. 7, the exemplary authenticating communications process 700 initially receives, by a first entity associated with a communication between a physical port of the first entity and a physical port of a second entity, a connection request to establish a communication with the second entity during step 702.

During step 704, the first entity generates a first pseudo-random value and provides the first pseudo-random value to the second entity during step 706. The first entity then obtains a second pseudo-random value from the second entity during step 708 and a shared secret typically known to both parties during step 710 for communications with each other.

During step 712, the first entity generates a first hash value based at least in part on the shared secret, the first pseudo-random value, the second pseudo-random value and the identifier of the first entity. The first entity then obtains a second hash value from the second entity based at least in part on the shared secret, the first pseudo-random value, the second pseudo-random value and an identifier of the first entity during step 714.

Finally, the communications are authenticated during step 716 when the first entity validates the first hash value using the second hash value.

The process 700 as shown in FIG. 7 is suitable for use in the system 100 but is more generally applicable to other types of systems comprising multiple host devices and a shared storage system.

Separate instances of the FIG. 7 process may be performed in respective additional host devices that share the storage array.

The particular processing operations and other system functionality described in conjunction with the pseudo code of FIGS. 4 and 6 and/or flow diagram of FIG. 7, for example, are presented by way of illustrative example only, and should not be construed as limiting the scope of the disclosure in any way. Alternative embodiments can use other types of processing operations involving host devices, storage systems and logics. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different configuration logic arrangements within a given information processing system.

Functionality such as that described in conjunction with the pseudo code of FIGS. 4 and 6 and/or flow diagram of FIG. 7, for example, can be implemented at least in part in the form of one or more software programs stored in memory and executed by a processor of a processing device such as a computer or server. As will be described herein, a memory or other storage device having executable program code of one or more software programs embodied therein is an example of what is more generally referred to herein as a "processor-readable storage medium."

Among other benefits, the disclosed techniques for authenticating communications between physical ports using knowledge of shared secrets provide built-in security, and protect, for example, against attacks based on physical access, such as "man-in-the-middle" attacks in the form of wiretapping, in at least some embodiments. In this manner, the disclosed techniques can significantly reduce costs for physical security as customers can be assured that their data is protected.

In addition, in some embodiments, the disclosed techniques for authenticating communications between physical ports using knowledge of shared secrets can protect against a variant of "man-in-the-disk" attacks where storage controllers that are not connected to the internet use external storage mediums to receive software patches/upgrades.

The disclosed techniques for authenticating communications between physical ports using knowledge of shared secrets can protect, for example, storage devices in high security areas (e.g., for financial, military and/or medical applications), personal laptops/desktops, supply chain security/assurance, industrial control systems and medical equipment, as would be apparent to a person of ordinary skill in the art based on the present disclosure.

The above-described functions associated with functionality for authenticating communications between physical ports using knowledge of shared secrets are carried out at least in part under the control of authentication modules 114. For example, authentication module 114-1 is illustratively configured to control performance of portions of the processes shown in the flow diagram described above in conjunction with FIG. 7.

An apparatus may comprise a host device comprising a processor coupled to memory, the host device being configured to communicate over a network with a storage system via a plurality of paths, the host device being configured to implement the disclosed techniques for authenticating communications between physical ports using knowledge of shared secrets.

A computer program product may comprise a non-transitory processor-readable storage medium having stored therein program code of one or more software programs, wherein the program code, when executed by at least one processor of a host device, causes the host device to implement the disclosed techniques for authenticating communications between physical ports using knowledge of shared secrets.

It is assumed that each of the other MPIO drivers 112 are configured in a manner similar to that described above and elsewhere herein for the first MPIO driver 112-1. The other host devices 102 of the system 100 are therefore also configured to communicate over the SAN 104 with the storage array 105, and the MPIO drivers 112 of such other host devices 102 are each similarly configured to select IO operations from a corresponding IO queue for delivery to the storage array 105 over the SAN 104. Accordingly, functionality described above in the context of the first MPIO driver 112-1 is assumed to be similarly performed by each of the other MPIO drivers, such as MPIO driver 112-N.

The MPIO drivers 112 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support functionality for authenticating communications between physical ports using knowledge of shared secrets.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with non-volatile memory express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeOF.

It is to be appreciated that these and other features of illustrative embodiments are presented by way of example only and should not be construed as limiting in any way. Accordingly, different numbers, types and arrangements of system components such as host devices 102, SAN 104, storage array 105, storage devices 106, IO queues, MPIO drivers 112, authentication modules 114 and controllers 120 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise RAM, ROM, flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™, or Vblock® converged infrastructure from Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the authentication module 114 may be implemented at least in part in software, as indicated previously herein.

One or more embodiments of the disclosure provide improved methods, apparatus and computer program products for authenticating communications between physical ports using knowledge of shared secrets. The foregoing applications and associated embodiments should be considered as illustrative only, and numerous other embodiments can be configured using the techniques disclosed herein, in a wide variety of different applications.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, MPIO drivers and additional or alternative components. Also, the particular configurations of system and device elements and associated processing operations illustratively shown in the drawings can be varied in other embodiments. For example, a wide variety of different MPIO driver configurations and storage array arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. A method, comprising:
   receiving, by a first entity associated with a communication between a first physical port of the first entity and a second physical port of a second entity, a connection request to establish a communication with the second entity;
   generating, by the first entity, a first pseudo-random value based at least in part on a first time-based value;
   providing, by the first entity, the first pseudo-random value to the second entity;
   obtaining, by the first entity, a second pseudo-random value from the second entity, wherein the second pseudo-random value is based at least in part on a second time-based value, wherein at least one of the first time-based value and the second time-based value is obtained by applying a hash function to a respective value derived from at least a timestamp;
   obtaining, by the first entity, a first shared secret established, prior to the receiving of the connection request, for communications with the second entity;
   generating, by the first entity, a first hash value based at least in part on the first shared secret, the first pseudo-random value and the second pseudo-random value;
   obtaining, by the first entity, a second hash value from the second entity based at least in part on the first shared secret, the first pseudo-random value and the second pseudo-random value;
   authenticating, by the first entity, the communication in response to the first entity validating the first hash value using the second hash value; and
   generating a new shared secret following the authenticating, wherein the second entity and at least one additional entity connect to the first entity using the new shared secret;
   wherein the method is performed by at least one processing device of the first entity, said at least one processing device comprising a processor coupled to a memory.

2. The method of claim 1, wherein the first entity comprises a target and wherein the second entity comprises an initiator.

3. The method of claim 1, wherein the validating the first hash value using the second hash value comprises determining if the first hash value matches the second hash value.

4. The method of claim 1, further comprising generating a connection error in response to the fourth hash value not matching the third hash value, such that a subsequent connection request from the second entity to the first entity is blocked by the first entity.

5. The method of claim 1, further comprising generating a symmetric encryption key for the communication between the first physical port of the first entity and the second physical port of the second entity, and wherein the symmetric encryption key is derived at least in part from the new shared secret.

6. The method of claim 5, wherein the communication between the first physical port of the first entity and the second physical port of the second entity employs a secure authenticated communication channel using the symmetric encryption key.

7. The method of claim 6, wherein each message on the secure authenticated communication channel is encrypted using the symmetric encryption key.

8. The method of claim 5, wherein each packet of the communication between the first physical port of the first entity and the second physical port of the second entity comprises a Message Authentication Code to detect corruption of data in a given packet.

9. The method of claim 8, wherein each packet of the communication between the first physical port of the first entity and the second physical port of the second entity further comprises a sequence number to derive the Message Authentication Code of a given packet for verification by a recipient of the given packet.

10. The method of claim 1, comprising generating a third hash value based at least in part on the first shared secret and providing the third hash value to the second entity, wherein the second entity generates a fourth hash value based at least in part on the first shared secret and provides an acknowledgement to the first entity in response to the fourth hash value matching the third hash value.

11. An apparatus comprising:
at least one processing device of a first entity associated with a communication between a first physical port of the first entity and a second physical port of a second entity, wherein the at least one processing device comprises a processor coupled to a memory;
the at least one processing device of the first entity being configured to implement:
receiving, by the first entity, a connection request to establish a communication with the second entity;
generating, by the first entity, a first pseudo-random value based at least in part on a first time-based value;
providing, by the first entity, the first pseudo-random value to the second entity;
obtaining, by the first entity, a second pseudo-random value from the second entity, wherein the second pseudo-random value is based at least in part on a second time-based value, wherein at least one of the first time-based value and the second time-based value is obtained by applying a hash function to a respective value derived from at least a timestamp;
obtaining, by the first entity, a first shared secret established, prior to the receiving of the connection request, for communications with the second entity;
generating, by the first entity, a first hash value based at least in part on the first shared secret, the first pseudo-random value and the second pseudo-random value;
obtaining, by the first entity, a second hash value from the second entity based at least in part on the first shared secret, the first pseudo-random value and the second pseudo-random value;
authenticating, by the first entity, the communication in response to the first entity validating the first hash value using the second hash value; and
generating a new shared secret following the authenticating, wherein the second entity and at least one additional entity connect to the first entity using the new shared secret.

12. The apparatus of claim 11, further comprising generating a symmetric encryption key for the communication between the first physical port of the first entity and the second physical port of the second entity, and wherein the symmetric encryption key is derived at least in part from the new shared secret.

13. The apparatus of claim 12, wherein the communication between the first physical port of the first entity and the second physical port of the second entity employs a secure authenticated communication channel using the symmetric encryption key, and wherein each message on the secure authenticated communication channel is encrypted using the symmetric encryption key.

14. The apparatus of claim 12, wherein each packet of the communication between the first physical port of the first entity and the second physical port of the second entity comprises a Message Authentication Code to detect corruption of data in a given packet.

15. The apparatus of claim 11, comprising generating a third hash value based at least in part on the first shared secret and providing the third hash value to the second entity, wherein the second entity generates a fourth hash value based at least in part on the first shared secret and provides an acknowledgement to the first entity in response to the fourth hash value matching the third hash value.

16. A non-transitory processor-readable storage medium having stored therein program code of one or more software programs, wherein the program code, when executed by at least one processing device of a first entity associated with a communication between a first physical port of the first entity and a second physical port of a second entity, causes the at least one processing device to perform:
receiving, by the first entity, a connection request to establish a communication with the second entity;
generating, by the first entity, a first pseudo-random value based at least in part on a first time-based value;
providing, by the first entity, the first pseudo-random value to the second entity;
obtaining, by the first entity, a second pseudo-random value from the second entity, wherein the second pseudo-random value is based at least in part on a second time-based value, wherein at least one of the first time-based value and the second time-based value is obtained by applying a hash function to a respective value derived from at least a timestamp;
obtaining, by the first entity, a first shared secret established, prior to the receiving of the connection request, for communications with the second entity;
generating, by the first entity, a first hash value based at least in part on the first shared secret, the first pseudo-random value and the second pseudo-random value;
obtaining, by the first entity, a second hash value from the second entity based at least in part on the first shared secret, the first pseudo-random value and the second pseudo-random value;
authenticating, by the first entity, the communication in response to the first entity validating the first hash value using the second hash value; and
generating a new shared secret following the authenticating, wherein the second entity and at least one additional entity connect to the first entity using the new shared secret.

17. The non-transitory processor-readable storage medium of claim 16, further comprising generating a symmetric encryption key for the communication between the first physical port of the first entity and the second physical port of the second entity, and wherein the symmetric encryption key is derived at least in part from the new shared secret.

18. The non-transitory processor-readable storage medium of claim 17, wherein the communication between the first physical port of the first entity and the second physical port of the second entity employs a secure authenticated communication channel using the symmetric encryption key, and wherein each message on the secure authenticated communication channel is encrypted using the symmetric encryption key.

19. The non-transitory processor-readable storage medium of claim 17, wherein each packet of the communication between the first physical port of the first entity and the second physical port of the second entity comprises a Message Authentication Code to detect corruption of data in a given packet.

20. The non-transitory processor-readable storage medium of claim 16, comprising generating a third hash value based at least in part on the first shared secret and providing the third hash value to the second entity, wherein the second entity generates a fourth hash value based at least in part on the first shared secret and provides an acknowledgement to the first entity in response to the fourth hash value matching the third hash value.

* * * * *